United States Patent Office 2,744,114
Patented May 1, 1956

2,744,114

PYRIDOXINE SYNTHESIS

Reuben G. Jones, Indianapolis, Ind., assignor to Eli Lilly and Company, Indianapolis, Ind., a corporation of Indiana No Drawing. Application May 21, 1952,
Serial No. 289,209

2 Claims. (Cl. 260—297.5)

This invention relates to pyridoxine and more particularly to a novel synthetic process for its preparation.
As is known, pyridoxine, represented by the formula

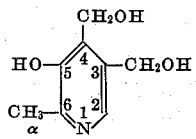

comprises an α-picoline nucleus substituted in the 3 position by a hydroxyl group and in the 4 and 5 positions by carbinol groups, i. e., hydroxymethyl groups.

In the preparation of a picoline compound of the above character, i. e., one containing carbinol groups in the 4 and 5 positions, the provision of the carbinol groups has hitherto constituted the most difficult aspect of the synthesis, and the syntheses of the past have been concerned primarily with the provision of those groups.

It has hitherto been found that lithium aluminum hydride is advantageously employed in providing 3-substituted α-picoline compounds with carbinol groups in the 4 and 5 positions. According to this method of preparation, a 2-substituted α-picoline compound having carboxyester groups is reduced with lithium aluminum hydride in inert solvent solution. After the reduction is accomplished, the excess lithium aluminum hydride is decomposed by adding a small amount of water, whereby lithium and aluminum compounds are precipitated, and commonly removed by filtration. Since an excess of lithium aluminum hydride must be used, large amounts of inorganic salts of amorphous or gelatinous structural character are present in the reaction mixture after the decomposition with water. These inorganic salts are difficult to remove, since because of their nature they readily clog filters and the like. Furthermore, they entrap quantities of the reaction products during the course of the precipitation, and thus occasion losses in the recovery of the end products of the process.

It is an object of this invention to provide a process useful for the provision of carbinol groups in the pyridoxine molecule which retains the advantage of reduction of carboxyester groups but in which process the reducing agent is readily and completely removable without loss.

It has been discovered that 3-substituted α-picoline compounds with carbinol groups in the 4 and 5 positions are readily prepared by reducing with lithium borohydride a compound having the formula

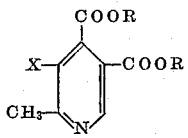

in which X represents hydroxy, and R is an esterifying radical.

Compounds corresponding to the above formula are known to the art, or are easily prepared from known compounds by simple esterification, alkylation or acylation procedures. For example, 3-hydroxy-4,5-dicarboxy-α-picoline and 3-amino-4,5-dicarboxy-α-picoline are known compounds and are readily esterified by commonly used, simple esterification processes, to yield compounds which serve as starting materials for the process of my invention. For the purposes of this invention the character of the esterifying radical is of minor importance, and as will be understood by those skilled in the art, that radical can be any of a great number of esterifying radicals. For reasons of availability, and to obtain maximum yields of reduced products, I prefer to employ esterifying radicals which are alkyl radicals, and particularly the lower alkyl radicals such as the methyl and ethyl radicals.

By starting with a compound of the character shown in the above formula and reacting it with lithium borohydride, I obtain pyridoxine directly. When X is an acyloxy group, that group is converted to a hydroxyl group by lithium borohydride so that pyridoxine is obtained directly without additional process steps.

The general procedure for carrying out my invention is as follows:

Lithium borohydride is suspended or dissolved in an inert solvent of the type known to be suitable for carrying out lithium aluminum hydride reductions, e. g. ethyl ether, dioxane, dibutyl ether, tetrahydrofuran, N-ethylmorpholine and the like. This suspension or solution is mixed with the 3-substituted α-picoline-4,5-dicarboxyester to be reduced. Preferably, the carboxylated picoline compound is added to the lithium borohydride. The picoline compound is added slowly in small portions in order to prevent too violent a reaction, since the reaction is exothermic. The picoline compound can be added as a dry solid or, more conveniently, can be added in the form of a suspension or solution. After all of the picoline compound has been added and is completely reduced, the 2-methyl-3-substituted-4,5-dihydroxymethylpyridine which is produced is recovered from the reaction mixture by adding methanol and an acid, for example, a mineral acid such as hydrochloric acid, to the reaction mixture to decompose the excess lithium borohydride and lithium-boron complexes formed during the reaction, and distilling off the resulting methyl borate and organic solvents. The 2-methyl-3-substituted-4,5-di-hydroxymethylpyridine is readily recovered from the residue, as by extraction of the aqueous residue with an immiscible solvent, and evaporation of the extracts, and the like.

In carrying out the above-described reaction, a stoichiometric amount of lithium borohydride can be employed, but preferably an excess is used to insure complete reduction of the picoline compound. The amount of lithium borohydride used in excess is not critical and the process is operable with excesses of 100 percent or upwards.

The following specific examples further illustrate the process of the invention.

Example 1

2 g. of 2-methyl-3-amino-4,5-pyridine dicarboxylic acid [prepared according to the method of Itiba and Emoto, Sci. Papers Inst. Phys. Chem. Research (Tokyo) 38, 347, 1941] are dissolved in 50 cc. of methanol and the solution is treated with an excess of diazomethane dissolved in 100 cc. of ether. The mixture is allowed to stand at room temperature for thirty minutes, and the methanol, ether and excess diazomethane are distilled off. A white solid, consisting of dimethyl 2-methyl-3-amino-4,5-pyridinedicarboxylate melting at about 94–95° C., is removed as a residue.

To a slurry of .66 g. (0.03 mol) of lithium borohydride in 50 cc. of anhydrous ether and contained in a flask equipped with a calcium chloride drying tube is added in a fine stream a suspension of 3.4 g. (0.015 mol) of dimethyl 2-methyl-3-amino-4,5-pyridinedicarboxylate in 150 cc. of anhydrous ether. The suspension is heated under reflux for twenty-six hours. After cooling, 10 cc. of distilled water are added dropwise, followed by 200 cc. of methanol containing 5 cc. of concentrated hydrochloric acid. The resulting solution is then distilled using an 18-inch Vigreaux column. Samples of the distillate are collected periodically and ignited, until the characteristic green flame of methyl borate is no longer present. Supplementary methanol is added to the distillation flask occasionally to maintain the volume of the reaction mixture at about 300 cc. After the removal of the methyl borate, 150 cc. of water are added to the reaction mixture and the remaining organic solvents are removed by distillation. The aqueous residue is transferred to a liquid-liquid extractor, made basic by the addition of 5 g. of sodium hydroxide, and extracted for two days with ether, and for one day with ethyl acetate. The ether extract is dried over anhydrous magnesium sulfate, and evaporated to dryness, whereupon 1 g. of white crystals of 2-methyl-3-amino-4,5-di-hydroxymethylpyridine melting at about 135–136° C. are obtained. Evaporation of the ethyl acetate extract yields 1.5 g. of 2-methyl-3-amino-4,5-dihydroxymethylpyridine, melting at 125–130° C.

A mixed melting point of the 2-methyl-3-amino-4,5-dihydroxymethylpyridine thus prepared, after recrystallization from ethyl acetate, with authentic 2-methyl-3-amino-4,5-dihydroxymethylpyridine melting at 139–140° C., shows no depression.

*Example 2*

To a solution of 0.88 g. (0.04 mols) of lithium borohydride in 100 cc. of freshly distilled tetrahydrofuran contained in a flask provided with a calcium chloride drying tube is added a solution of 4.51 g. (0.02 mols) of dimethyl 2-methyl-3-amino-4,5-pyridinedicarboxylate in 150 cc. of tetrahydrofuran. The reaction mixture is heated under reflux with stirring for about sixteen hours. Fifty cc. of water are added cautiously to the cooled reaction mixture, followed by 200 cc. of methanol containing 10 cc. of concentrated hydrochloric acid. The solution is distilled using a 1-inch column packed with glass helices until a sample of the distillate no longer burns with a green flame. Methanol is added to the flask periodically to maintain the volume at about 400 cc. The reaction mixture is made slightly basic with sodium bicarbonate solution and concentrated to dryness in vacuo. The solid residue is extracted with four 200 cc. portions of ethyl acetate, and the combined extracts are concentrated to 400 cc. in volume and placed in the refrigerator. A white granular precipitate of 2-methyl-3-amino-4,5-di-hydroxymethylpyridine forms and is removed by filtration. A yield of 2.17 g. of material melting at 139–141° C. is obtained. A mixed melting point determination with an authentic sample of 2-methyl-3-amino-4,5-di-hydroxymethylpyridine melting at 138–140° C. shows no depression.

*Example 3*

A mixture of 5 g. of 2-methyl-3-amino-4,5-pyridinedicarboxylic acid and 100 cc. of n-butanol is saturated with dry hydrogen chloride. The resulting mixture is refluxed for twenty hours. The mixture is evaporated in vacuo, and the residue, comprising di-n-butyl 2-methyl-3 - amino - 4,5 - pyridine - dicarboxylate hydrochloride, is treated with an excess of aqueous 10 percent sodium bicarbonate. The dibutyl ester is extracted with ethyl acetate and the ethyl acetate extract is separated, dried over anhydrous magnesium sulfate, and evaporated to dryness in vacuo. A syrupy residue of the dibutyl ester is obtained, which gradually crystallizes when allowed to stand under petroleum ether. Di-n-butyl 2-methyl-3-amino-4,5-pyridinedicarboxylate thus prepared melts at about 112–114° C.

To a solution of 2 g. of lithium borohydride in 100 cc. of freshly distilled tetrahydrofuran is added a solution of 5 g. of di-n-butyl 2-methyl-3-amino-4,5-pyridinecarboxylate in 150 cc. of tetrahydrofuran according to the procedure of Example 2. The reaction mixture is treated as described in Example 2 to cover the 2-methyl-3-amino-4,5-di-hydroxymethylpyridine formed in the reaction.

*Example 4*

A solution of 1.3 g. of dibenzyl 2-methyl-3-amino-4,5-pyridinedicarboxylate, prepared by the reaction of 2 - methyl - 3 - amino - 4,5 - pyridinedicarboxylic acid with phenyldiazomethane, in 50 cc. of dry ether is slowly added to a suspension of 1 g. of lithium borohydride in 200 cc. of anhydrous ether, under reflux. The resulting solution is treated according to the method of Example 2, to recover the 2-methyl-3-amino-4,5-dihydroxymethylpyridine formed in the reaction. 2-methyl-3-amino-4,5-di-hydroxymethylpyridine, melting at 141–142° C., is recovered.

*Example 5*

A suspension of 2 g. of the dimethyl ester of 5-methoxy-7-methylcinchomeronic acid [prepared according to the method of Itiba and Emoto, Sci. Papers Inst. Phys. Chem. Research (Tokyo) 39, 126–30, 1941] in 80 cc. of anhydrous ether is reacted with an ethereal slurry of 2 g. of lithium borohydride by the procedure described in Example 1, and 2-methyl-3-methoxy-4,5-di-hydroxymethylpyridine is recovered by the described procedure. The 2-methyl-3-methoxy-4,5-di-hydroxymethylpyridine is converted to the hydrochloride salt by dissolving the crude material in 10 cc. of anhydrous ethanol and saturating the solution with dry hydrogen chloride. The solution is filtered and evaporated to dryness, whereupon a white, crystalline residue of the hydrochloride salt of pyridoxine methyl ether is obtained. On recrystallization from alcohol, pyridoxine methyl ether hydrochloride melting at 149–151° C. is obtained. The pyridoxine methyl ether hydrochloride can be converted to pyridoxine by known procedures, e. g. by cleaving the ether with hydrobromic acid, and hydrolyzing the 4,5-dibromomethyl compound which is formed, to obtain pyridoxine.

*Example 6*

Dimethyl 2 - methyl - 3 - acetoxy - 4,5 - pyridinedicarboxylate is obtained by heating a solution of 0.7 g. of dimethyl 2 - methyl - 3 - hydroxy - 4,5 - pyridinedicarboxylate in 10 cc. of acetic anhydride for four hours on a steam bath. The solution is evaporated to dryness in vacuo to remove as completely as possible the acetic anhydride and acetic acid, and the residual syrup, comprising dimethyl 2 - methyl - 3 - acetoxy - 4,5 - pyridinedicarboxylate, is covered with petroleum ether and placed in a refrigerator. After several hours' standing the residue crystallizes. The crystals are filtered off and recrystallized from a mixture of dry ether and petroleum ether. Dimethyl 2 - methyl - 3 - acetoxy - 4,5 - pyridinedicarboxylate thus prepared melts at about 61–62° C.

A solution of 2 g. of dimethyl 2 - methyl - 3 - acetoxy - 4,5 - pyridinecarboxylate prepared as described above in 150 cc. of tetrahydrofuran is slowly added to a mixture of 1 g. of lithium borohydride and 50 cc. of freshly distilled tetrahydrofuran, according to the procedure of Example 2. The reaction mixture is heated under reflux for about 12 hours, and cooled. Fifty cc. of water are added cautiously, followed by 100 cc. of methanol containing 5 cc. of concentrated hydrochloric acid. The solution is distilled through a fractionating column until a sample of the distillate no longer burns with a green flame. Methanol is added to the flask periodically to maintain the volume at about 300 cc. Thereafter 100 cc. of water are added and the remaining organic solvents are removed by distillation. The aqueous residue is saturated with carbon dioxide and filtered while hot. The filtrate is evaporated to dryness and the residue, comprising pyridoxine, is extracted with two 25 cc. portions of warm ethanol. The combined ethanol extracts are filtered and saturated with dry hydrogen chloride. The resulting solution is evaporated to about 5 cc. in volume, and cooled in an ice bath, whereupon pyridoxine hydrochloride crystallizes out and is removed by filtration, washed with anhydrous ether and dried.

*Example 7*

A suspension of 2.8 g. of 2 - methyl - 3 - hydroxy - 4,5 - pyridinedicarboxylic acid [obtained by the method of Itiba and Emoto, Sci. Papers Inst. Phys. Chem. Research (Tokyo) 38, 347, 1941] in 100 cc. of dry methanol is saturated with dry hydrogen chloride. The mixture is refluxed for about eighteen hours and then evaporated to small volume. The residue thus obtained is made neutral with 10 percent aqueous sodium bicarbonate, and the dimethyl 2 - methyl - 3 - hydroxy - 4,5 - pyridinedicarboxylate formed in the reaction is extracted from the solution using ethyl acetate. On evaporation of the ethyl acetate, the dimethyl ester is recovered as a white, crystalline solid melting at about 138.5–139° C.

A solution of 1.0 g. of dimethyl 2 - methyl - 3 - hydroxy - 4,5 - pyridinedicarboxylate prepared as described above, in 80 cc. of tetrahydrofuran, is slowly added to a solution of 0.5 g. of lithium borohydride in 50 cc. of freshly distilled tetrahydrofuran, following the procedure of Example 2. The reaction mixture is treated to recover the pyridoxine which is formed in the same manner as is set forth in Example 6.

I claim:

1. A process step in the preparation of pyridoxine which comprises heating with lithium borohydride in an ethereal solvent a compound represented by the formula

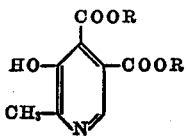

wherein R represents a lower alkyl radical, to produce 2 - methyl - 3 - hydroxy - 4,5 - dihydroxymethylpyridine, adding a lower aliphatic alcohol and a mineral acid to the reaction mixture, heating the mixture to convert the boron compounds present to a boric acid ester of the alcohol, separating the boric acid ester, and isolating the 2 - methyl - 3 - hydroxy - 4,5 - dihydroxymethylpyridine.

2. A process step in the preparation of pyridoxine which comprises heating with lithium borohydride in tetrahydrofuran solution a compound represented by the formula

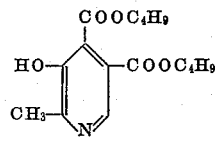

to produce 2 - methyl - 3 - hydroxy - 4,5 - dihydroxymethylpyridine, adding methanol and a mineral acid to the reaction mixture, heating the mixture to convert the boron compounds present to methyl borate, separating the methyl borate, and isolating the 2 - methyl - 3 - hydroxy - 4,5 - dihydroxymethylpyridine.

References Cited in the file of this patent
UNITED STATES PATENTS

| | | |
|---|---|---|
| 2,590,841 | Cohen | Apr. 1, 1952 |
| 2,650,232 | Jones | Aug. 25, 1953 |

FOREIGN PATENTS

| | | |
|---|---|---|
| 629,450 | Great Britain | Sept. 20, 1949 |

OTHER REFERENCES

Nystrom et al.: J. A. C. S., vol. 71, pp. 3245–6 (1949).
Adams et al.: "Organic Reactions" (1951), vol. VI. pp. 471–73.